March 22, 1960
R. L. BEYERSTEDT
2,929,521
TRACTOR LOADER
Filed April 7, 1958
8 Sheets-Sheet 1
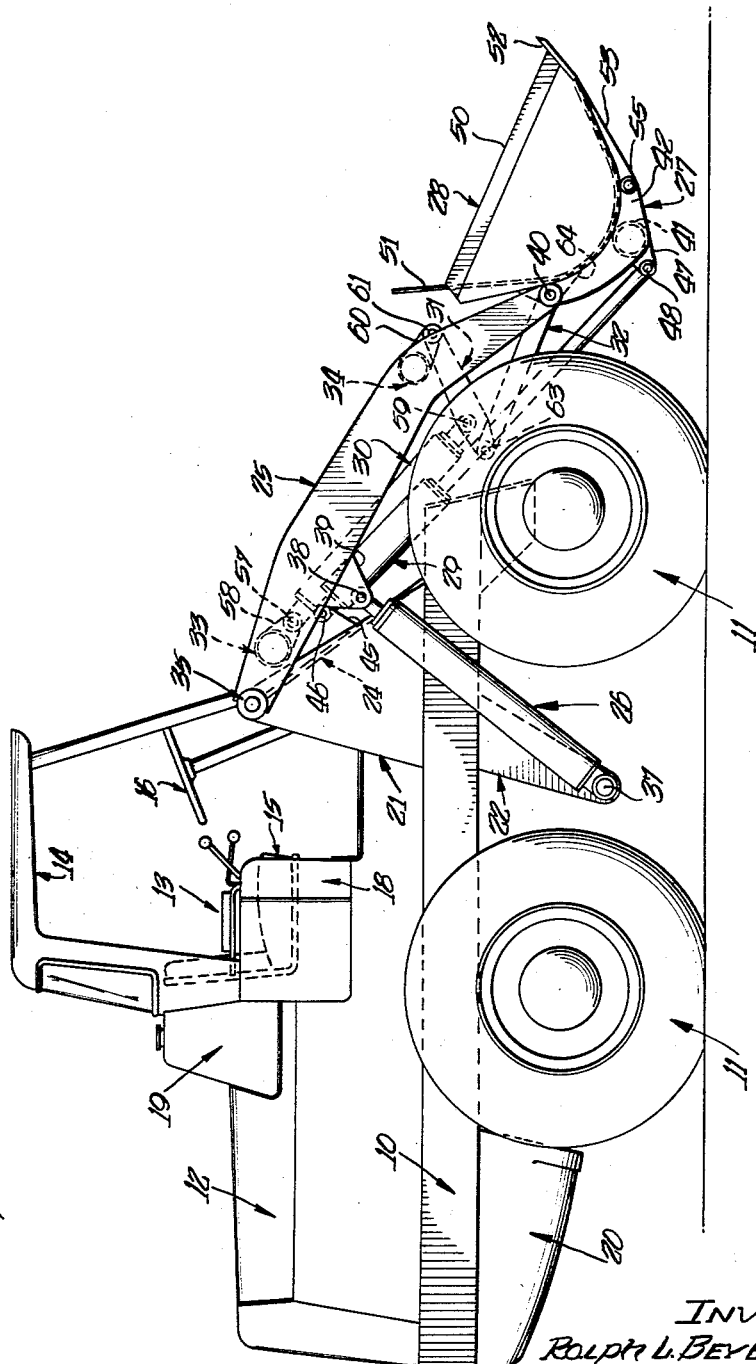
INVENTOR
Rolph L. Beyerstedt
Paul O. Pippel
ATTORNEY

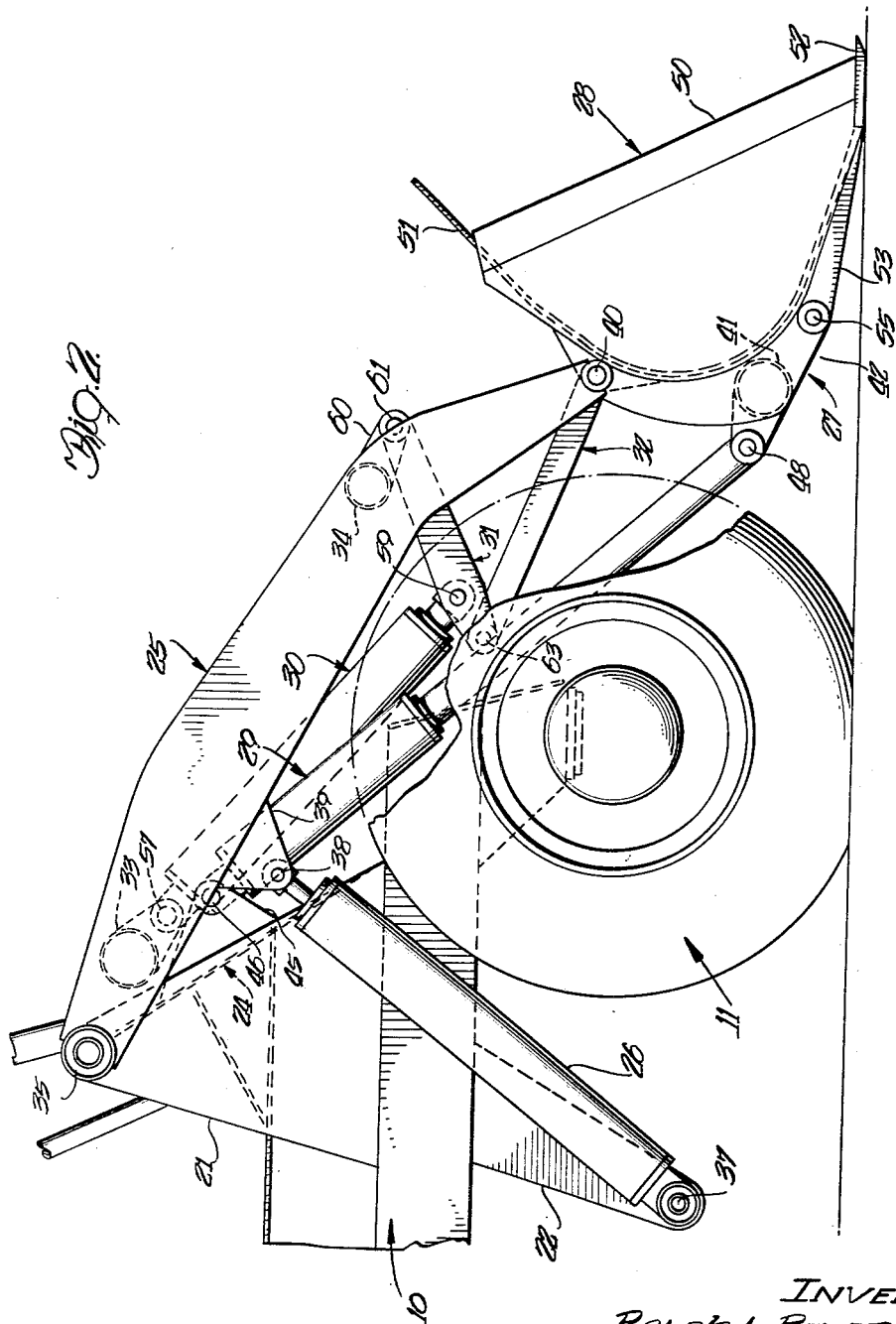

March 22, 1960  R. L. BEYERSTEDT  2,929,521
TRACTOR LOADER
Filed April 7, 1958  8 Sheets-Sheet 3
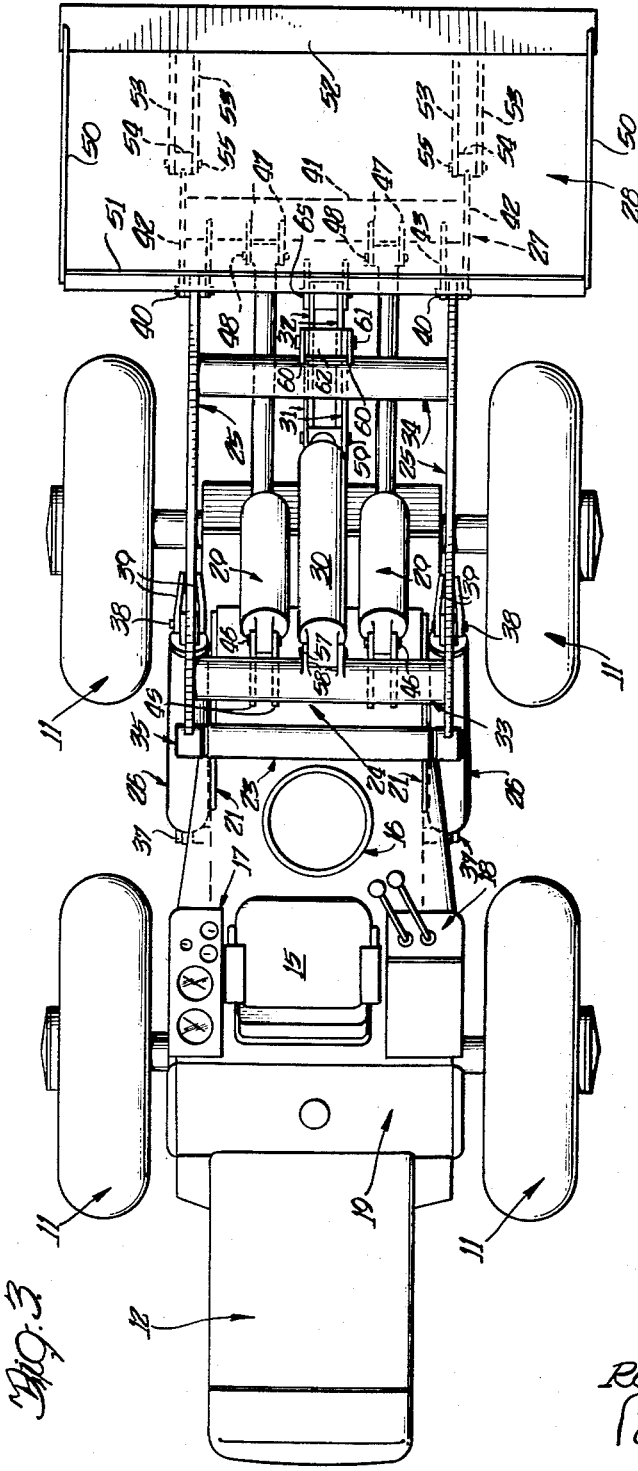
INVENTOR
Ralph L. Beyerstedt
Paul O. Pippel
ATTORNEY

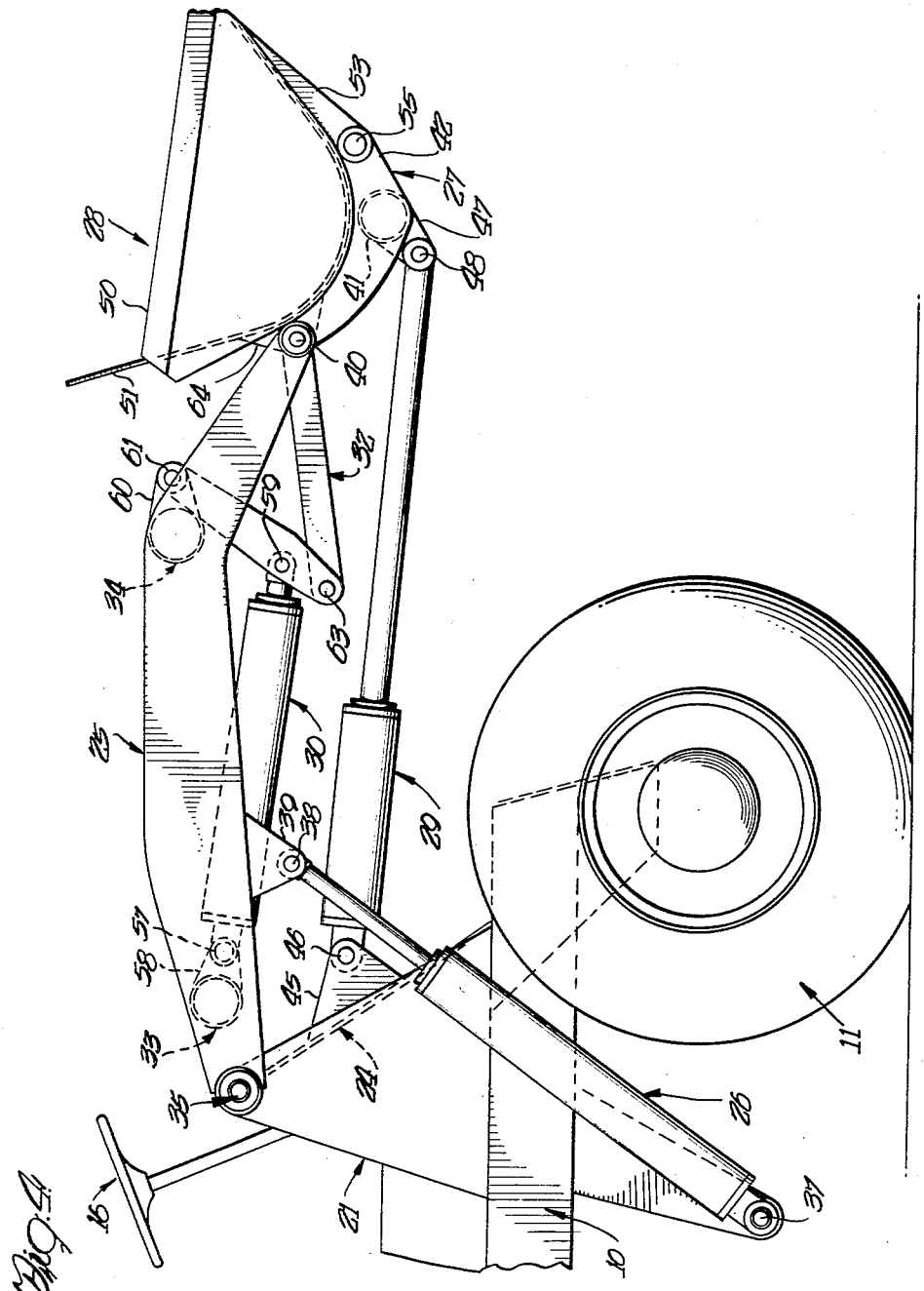

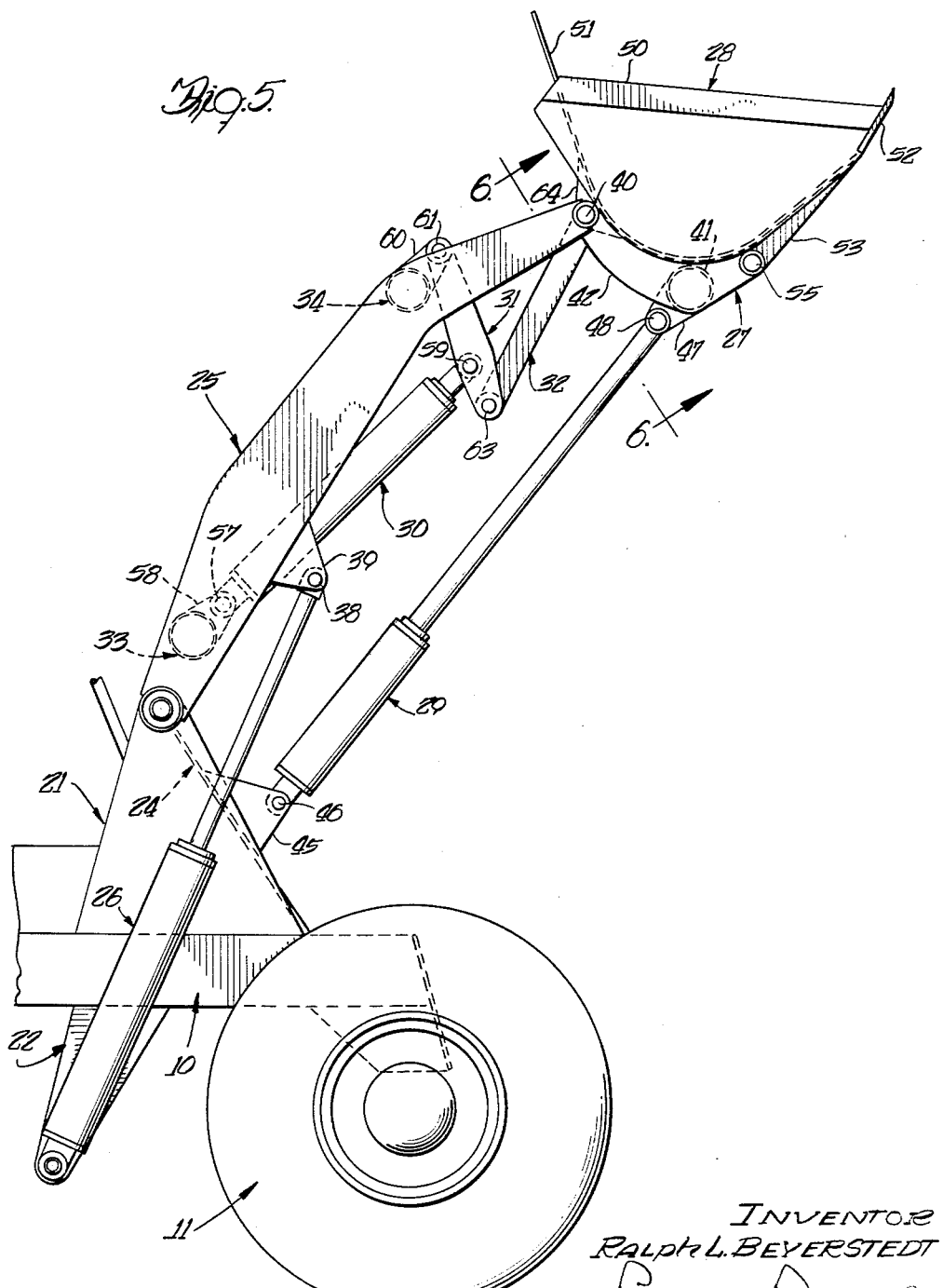

March 22, 1960 R. L. BEYERSTEDT 2,929,521
TRACTOR LOADER
Filed April 7, 1958 8 Sheets-Sheet 6
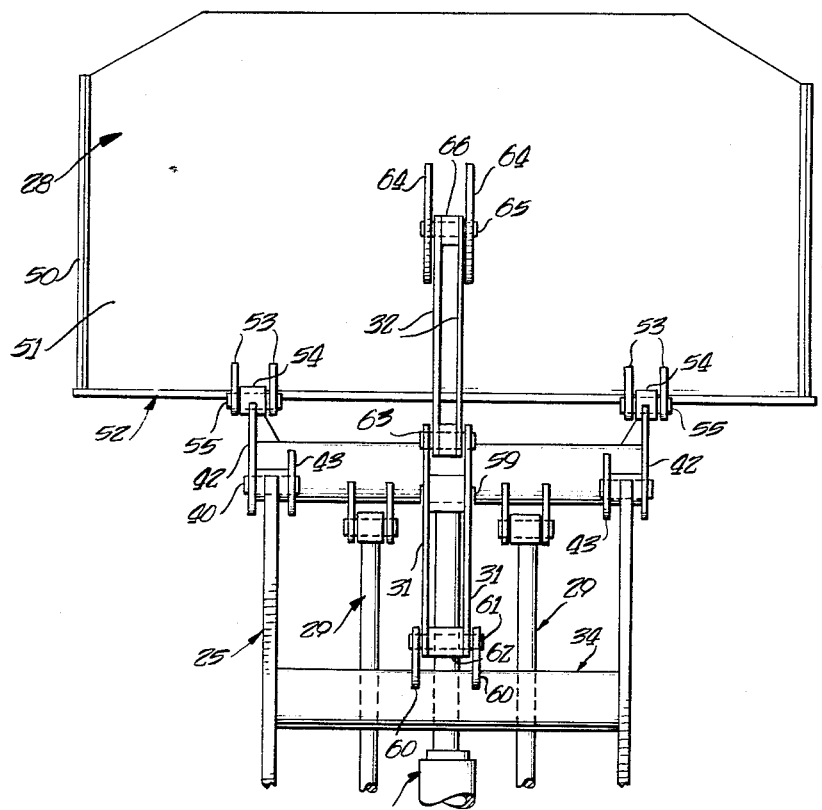
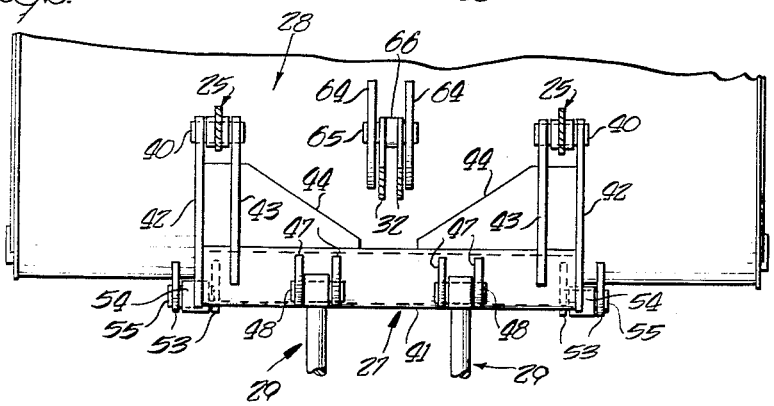
INVENTOR
RALPH L. BEYERSTEDT
Paul O. Pippel
ATTORNEY

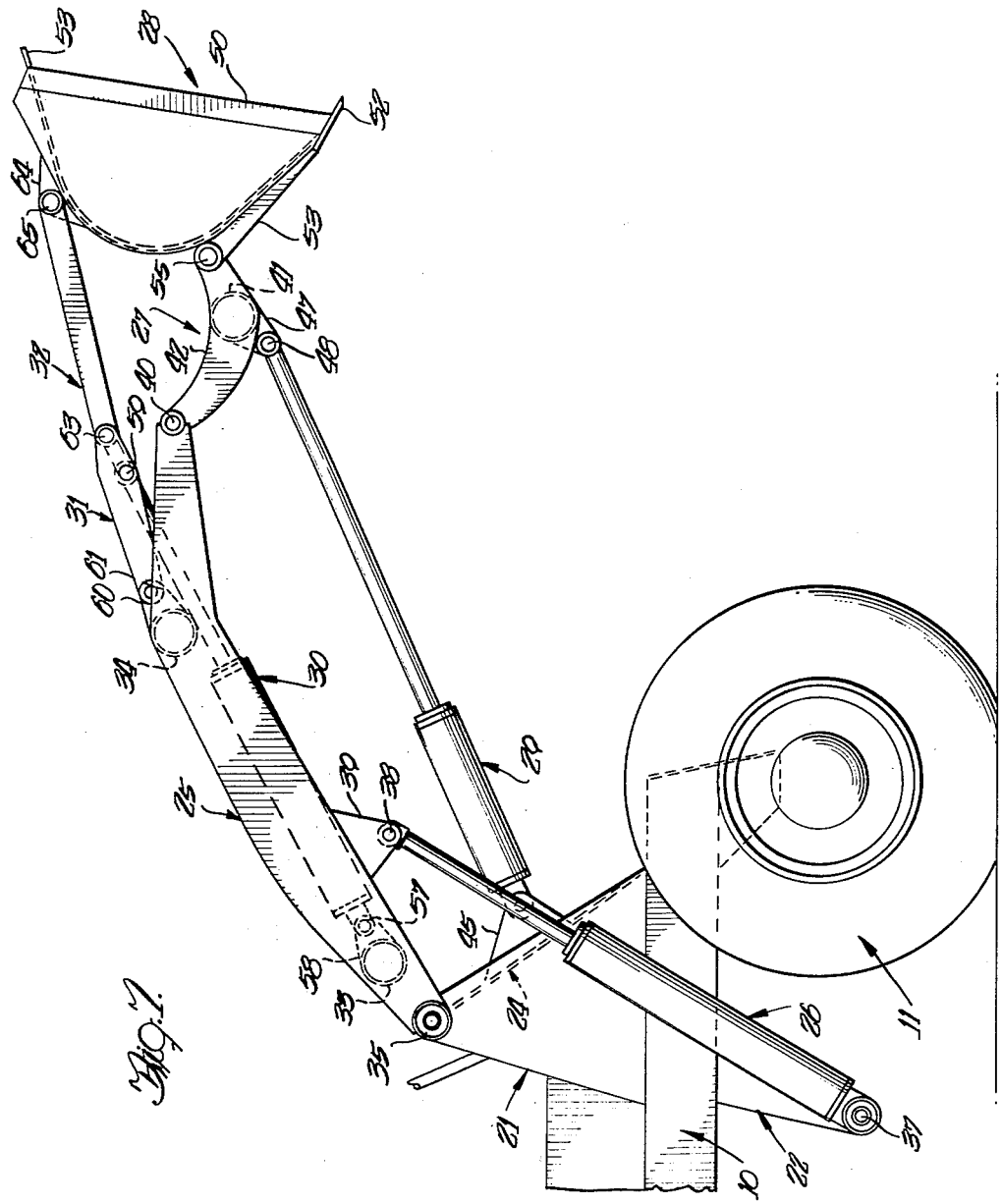

March 22, 1960 R. L. BEYERSTEDT 2,929,521
TRACTOR LOADER

Filed April 7, 1958 8 Sheets-Sheet 8

INVENTOR
Ralph L. Beyerstedt
Paul O. Pippel
ATTORNEY

United States Patent Office 2,929,521
Patented Mar. 22, 1960

2,929,521

TRACTOR LOADER

Ralph L. Beyerstedt, Libertyville, Ill., assignor to The Frank G. Hough Co., a corporation of Illinois Application April 7, 1958, Serial No. 726,785

13 Claims. (Cl. 214—140)

This invention relates to tractor loaders and more specifically to improvements in the tractor and the loader mechanism of a front-end type tractor loader.

The principal object of the present invention is to provide an improved tractor and loader mechanism combination wherein the machine will efficiently perform the various material handling functions of digging, carrying, dumping, and spreading while achieving an excellently balanced machine with easy accessibility to the operator's compartment and good visibility from the operator's compartment in all directions.

It is a further object of the present invention to provide a loader mechanism for a front end type tractor loader wherein good mechanical advantage is inherent in the linkage means interconnecting the bucket and the tractor.

A further object of the present invention is to provide a front end type tractor loader of a construction wherein the bucket may be positioned in many different operative positions, wherein the bucket may be dumped at a substantal dumping angle, wherein the bucket may be dumped from a substantially high point although the length of the machine with the bucket at ground level is relatively short, and wherein certain automatic pivoting operations of the bucket take place when the bucket is raised and lowered.

A feature of the present invention is the tractor construction thereof wherein the forward end of the tractor is substantially open and devoid of any front hood.

A further feature of the present invention is the use of three hydraulic ram assemblies which greatly increase the operator's control over the bucket.

A further feature of the present invention is that the bucket is automatically positioned in the digging position at ground level when all of the hydraulic rams are completely retracted.

Other objects and features of the present invention will be apparent upon a perusal of the following specification and drawings of which:

Figure 1 is a side elevational view of a tractor loader constructed according to the present invention and with the bucket in a load carrying position;

Figure 2 is an enlarged view of the forward portion of the machine shown in Figure 1 with the bucket in the dig position at ground level;

Figure 3 is a top plan view of the structure shown in Figure 1;

Figure 4 is an enlarged partial view of the structure shown in Figure 1 with the bucket in an intermediate carrying position;

Figure 5 is an enlarged partial view of the structure shown in Figure 1 with the bucket in the high lift carrying position;

Figure 6 is a partial rear view of the bucket and certain pivotal connections thereof taken along the line 6—6 of Figure 5;

Figure 7 is an enlarged partial view of the structure shown in Figure 1 with the bucket in an intermediate dump position;

Figure 9 is a top plan view of the bucket and some of the linkages connected thereto as shown in Figure 8.

Figure 8:
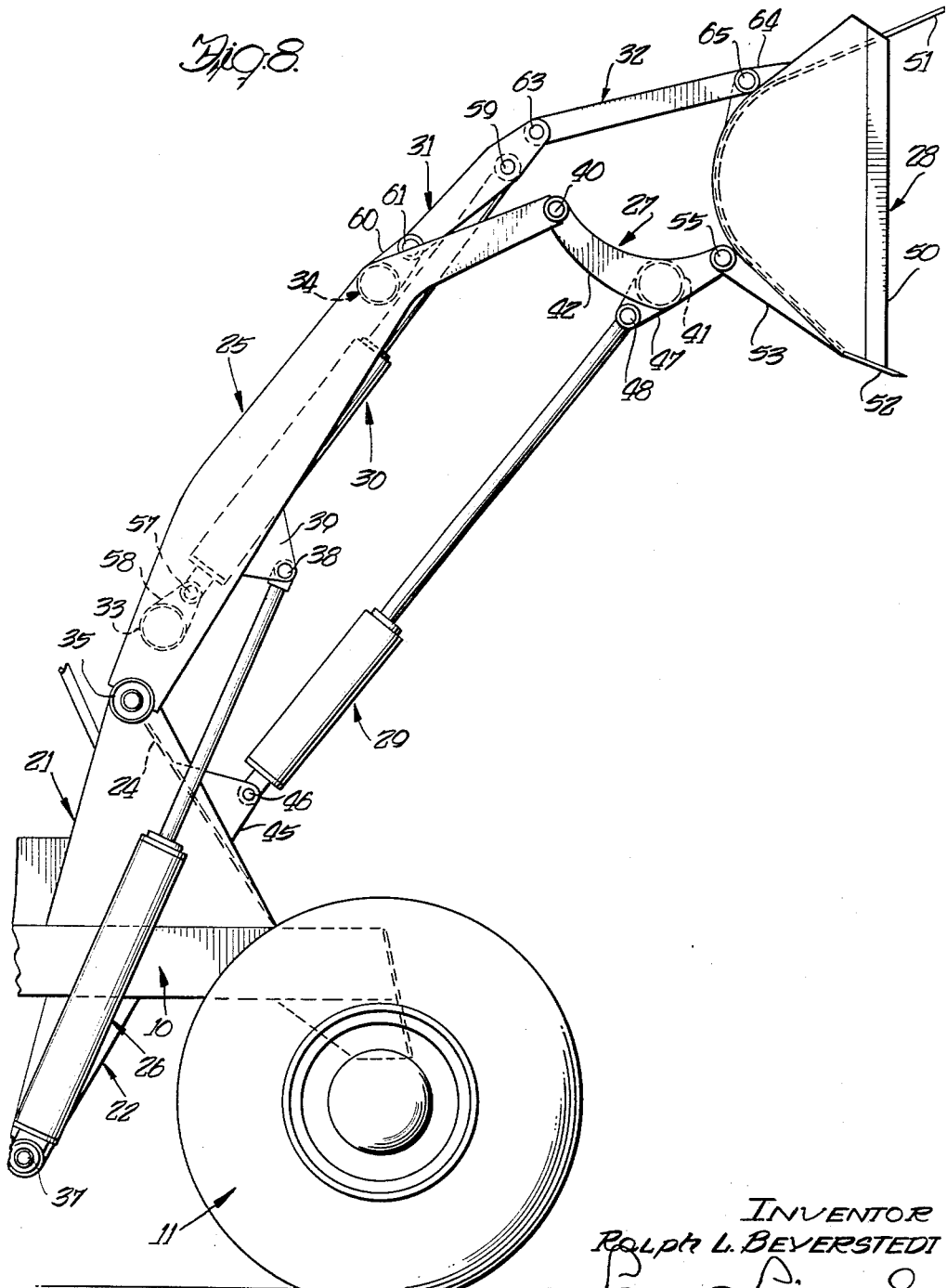
Figure 8 is an enlarged partial view of the structure shown in Figure 1 with the bucket in the high lift dump position.

The present embodiment is the preferred embodiment but it is to be understood that changes can be made in the present embodiment by one skilled in the art without departing from the spirit and scope of the present invention.

Generally the present invention comprises a tractor of the four wheel rubber tired type, with an operator's compartment mounted substantially at the longitudinal center of the tractor, with the forward portion of the frame of the tractor basically carrying the loader mechanism only. The loader mechanism comprises a boom, a bucket, a bucket carrier, a plurality of hydraulic rams having three separate functions, and certain linkage means. One set of hydraulic rams is provided to raise and lower the boom. A second set of hydraulic rams are provided for pivoting the bucket carrier relative to the boom, and another hydraulic ram is provided for pivoting the bucket relative to the bucket carrier.

The detailed construction and arrangement of these various parts of the present invention are described hereinafter for which reference is made to the drawings. As can be seen in Figures 1 and 3, the tractor comprises a frame 10 supported by wheels 11 with the frame 10 carrying an engine compartment 12 and an operator's compartment 13. The frame 10 may be roughly divided into three sections, a forward section, a middle section, and a rearward section. The rearward section carries the engine compartment 12, the middle section carries the operator's compartment 13 and the forward section is a relatively open platform on the frame 10 for carrying the loader mechanism. The canopy 14 which covers the operator's compartment 13 is removable therefrom and functions to protect the operator in inclement weather. The operator's compartment 13 includes a seat 15, a steering wheel 16, an instrument assembly 17 and a hydraulic control system 18. The fuel tank 19 is carried at the forward upper end of the engine compartment 12. A counterweight 20 is secured to the rearward end of the frame 10 to depend therefrom.

The loader mechanism is mounted on the tractor by means of two pairs of flanges 21 and 22. The pair of flanges 21 are each mounted on one side of the forward section of the frame 10 and upstand therefrom. The pair of flanges 21 are rigidly interconnected at their upper ends thereof by a cylindrical member 23 carried therebetween, and at the forward edges thereof by a plate 24 as can be seen in Figure 3. The pair of flanges 22 are secured to each side of the forward section of the frame 10 to depend therefrom.

The loader mechanism which is carried on the flanges 21 and 22 comprises a boom 25, a pair of hydraulic rams 26, a bucket carrier 27, a bucket 28, a pair of hydraulic rams 29, a hydraulic ram 30, a lever assembly 31 and a link assembly 32.

The boom 25 is formed in duplicate portions disposed on each side of the tractor and interconnected by cylindrical members 33 and 34. The rearward end of each portion of the boom 25 carries a bearing 35 which is pivotally connected to one end of the cylindrical member 23 carried by the upstanding flanges 21. The other end of the boom extends forwardly of the tractor. When the boom 25 is in its lowermost position, such as shown in Figure 1, the boom is inclined downwardly and the forward end thereof is slightly curved in a downward direction. The cylindrical member 33 of the boom 25 is positioned adjacent the rearward end of the boom and in the lowermost position of the boom is further positioned downwardly and forwardly of the bearing 35, as can be seen in Figure 1. The cylindrical member 34 is positioned at a point near the forward end of the boom 25. The pair of hydraulic rams 26 are provided for raising and lowering of the boom 25 about bearings 35. The head end of each of the hydraulic rams 26 is pivotally connected to the lower end of one of the flanges 22 by means of pivotal mounting means 37. The rod end of each of the hydraulic rams 26 is pivotally connected to one portion of the boom 25 through pivotal mounting means 38 and flanges 39. The flanges 39 are mounted on each portion of the boom 25 intermediate the ends thereof. Thus it may be seen that when the hydraulic rams 26 are extended, the boom 25 pivoted to positions such as shown in Figures 4, 5, 7 and 8. When the hydraulic rams 26 are completely retracted, the boom 25 is positioned as shown in Figure 1. The forward end of each portion of the boom 35 is pivotally mounted to the bucket carrier 27 through pivotal mounting means 40.

The bucket carrier 27 comprises a cylindrical member 41, a pair of plates 42, and a pair of plates 43, as may be seen in Figures 1, 3 and 6. The plates 42 are curved to have substantially the curvature of the rear wall of the bucket 28 and the plates 42 are each mounted on one end of the cylindrical member 41. The plates 42 are positioned intermediate their ends on the cylindrical member 41. The pair of plates 43 are each mounted on said cylindrical member 41 in transverse alignment with the upper rear portion of the plates 42 and spaced therefrom a distance sufficient to permit the pivotal connection of the boom 25 therebetween. A pair of reinforcing plates 44 as may be seen in Figure 6 are also provided for the bucket carrier 27. These reinforcing plates 44 are secured to the plates 42 and 43 and the cylindrical member 41 to provide for a rigid construction of the bucket carrier 27. The forward end of each portion of the boom 25 is pivotally carried between one of the plates 42 and 43 at the upper rearward end of the bucket carrier 27 by means of pivotal mounting means 40.

The pair of hydraulic rams 29 are provided for pivoting and holding the bucket carrier 27 relative to the boom 25. The head end of each of the hydraulic rams 29 is pivotally connected to a pair of flanges 45 by means of pivotal mounting means 46. Each pair of flanges 45 is mounted on the plate 24 to upstand therefrom. The rod end of each of the hydraulic rams 29 is pivotally carried between a pair of flanges 47 by means of pivotal mounting means 48. The pairs of flanges 47 are secured to the cylindrical member 41 of the bucket carrier 27 in a spaced apart relationship to each other and transversely thereof. Thus it may be seen that as the hydraulic rams 29 are extended and retracted, the bucket carrier 27 is pivoted about pivotal mounting means 40. The axis of pivotal mounting means 46 is positioned on the tractor forwardly and below the pivot axis of the bearings 35. When the boom 25 is in its lowermost position, and when the hydraulic rams 29 are completely extended, the pivotal mounting means 48 is positioned substantially vertically below and slightly forwardly of pivotal mounting means 40, as shown in Figure 1. When the boom 25 is in its lowermost position, and when the hydraulic rams 29 are completely retracted, the bucket carrier 27 will assume a position such as shown in Figure 2 wherein pivotal mounting means 48 is substantially below and slightly rearwardly of pivotal mounting means 40. The position shown in Figure 2 is the digging position. When the boom 25 is in its lowermost position, a plane through the pivot axes 46 and 48 will intersect a plane through the pivot axes of the pivotal mounting means 40 and the bearings 35 between bearings 35 and pivotal mounting means 40. This arrangement of the various pivot axes provides for an automatic movement of the bucket carrier 27 as the boom 25 is raised and lowered to the bucket 28 in substantially the position shown in Figure 1 with respect to the horizontal to prevent any load from falling rearwardly out of the bucket 28 and onto the tractor. This arrangement further provides for easy indexing of the carrier to the digging position since this position is achieved upon the complete retraction of hydraulic rams 29.

The bucket 28 is somewhat conventional in form and comprises a pair of spaced apart side walls 50, a curved plate 51 secured between the side walls 50 and forming the rear and bottom walls of the bucket 28, and a cutting edge 52 mounted on the forward marginal edge of the bottom wall of the bucket. The underside of the bottom wall of the bucket 28 is provided with two pairs of wedge shaped flanges 53 which are spaced transversely of the bucket. The forward end of each plate 42 of the bucket carrier 27 is formed as a bearing 54, and each bearing 54 is positioned between one pair of flanges 53 and pivotally connected thereto by means of a pin 55. It should be noted that the axis of pivoting of the bucket 28 about pins 55 is positioned on the bottom wall of the bucket 28 between the rear wall and the forward edge thereof. It is intended that this axis may be moved further forwardly of the bottom wall of the bucket 28 to a point substantially adjacent the cutting edge 52.

The hydraulic ram 30, levers 31, and links 32 which are provided for pivoting the bucket 28 relative to the bucket carrier 27 are carried by the boom 25 and connected to the bucket 28. The head end of the hydraulic ram 30 is pivotally connected by means of a pin 57 to a pair of flanges 58. The flanges 58 are mounted on the cylindrical member 33 of the boom 25. The rod end of the hydraulic ram 30 is pivotally connected between the levers 31 intermediate the ends thereof by means of a pin 59. One end of each of the levers 31 is pivotally connected to a pair of flanges 60 by means of a pin 61. The flanges 60 are mounted on the cylindrical member 34 of the boom 25, and the pin 61 extends therethrough, and through the levers 31 and a spacing block 62. The other end of each of the levers 31 is pivotally connected to one end of the links 32 by means of a pin 63. The other end of each of the links 32 is pivotally connected to a pair of flanges 64 by means of a pin 65. The links 32 are positioned between the flanges 64 and are spaced apart by a spacer block 66 positioned therebetween and having the pin 65 extending therethrough. The flanges 64 are secured to the rear wall of the bucket 28 and are arcuately positioned so that when the bucket 28 is in its rearwardmost pivoted position against the carrier 27, the pivotal axis of pin 65 substantially coincides with the pivotal axis of pivotal mounting means 40. This location of the pivot axis of the pin 65 permits the bucket 28 and the bucket carrier 27 to be pivoted relative to the boom either when the hydraulic rams 26 are extended or retracted to raise and lower the boom 25, or when the hydraulic rams 29 are extended or retracted to pivot the bucket carrier 27 and the bucket 28 relative to the boom 25. When hydraulic rams 26, 29 and 30 are completely retracted the bucket 28 is positioned in the digging position at ground level.

Any suitable hydraulic fluid pump, conduit and reservoir means (not shown) may be used and connected to the hydraulic valving 18 for selectively operating any of the hydraulic rams 26, 29 and 30.

Turning next to a description of the operation of the instant invention, reference is again made to the drawings. As shown in Fig. 1, the hydraulic rams 26 and 30 are completely retracted and the hydraulic rams 29 are completely extended. In this operated condition, the boom 25 is at its lowermost position, the bucket 28 is pivoted rearwardly against the carrier 27, and the bottom wall of the bucket 28 is inclined at an angle of approximately 40° from the horizontal. For digging at ground level, the operator will operate the hydraulic system to cause a complete retraction of hydraulic rams 29. The bucket carrier 27 and the bucket 28 will then be pivoted from the position shown in Fig. 1 to that shown in Fig. 2. In this position the operator of the loader may move the tractor forwardly to cause the cutting edge 52 of the bucket 28 to cut into the material being worked. If the hydraulic rams 29 are then fully extended, a breakout and load scooping action of the bucket 28 will take place to provide for a maximum loading of the bucket 28.

From the position shown in Fig. 1, the operator of the loader may raise the boom to a position such as shown in Fig. 4 by extensions of the hydraulic rams 26. As the boom 25 is raised from the position shown in Fig. 1 to that shown in Fig. 4, the bucket 28 is maintained substantially in the same pivoted position relative to ground level. This movement is caused by the previously recited locations of the bearings 35 and 40 relative to the pivotal mounting means 46 and 48 on the tractor. It should be noted that when the boom is raised from the position shown in Fig. 1 to that shown in Fig. 4 the bucket carrier 27 and bucket 28 are pivoted relative to the boom 25 about the axis of pivotal mounting means 40 and pin 65.

As shown in Fig. 5, wherein the hydraulic rams 26 have been completely extended, the bucket 28 has been moved to the high lift carrying position. In moving from the position shown in Fig. 4 to that shown in Fig. 5 the bucket 28 is maintained in substantially the same pivoted position relative to ground level, although during such motion the bucket carrier 27 and the bucket 28 have been pivoted relative to the boom 25 in a clockwise direction about bearings 40 and pin 65.

Figs. 7 and 8 respectively show the bucket 28 in the dump position with the boom 25 at an intermediate raised position and a maximum raised position. To move the bucket 28 to a dump position, the hydraulic ram 30 is extended. The levers 31 will multiply the movement of the hydraulic ram 30 and through the links 32 will pivot the bucket 28 relative to the bucket carrier 27 about the axis of pins 55. Although not shown, the bucket 28 may be further or additionally dumped by retraction of the hydraulic rams 29, thereby pivoting the bucket carrier 27 in a clockwise direction as viewed in the drawings.

Any combinations of the above described operations of the subject invention may be used to perform the various loader functions known in the art. If the boom 25 is lowered with the bucket operated to a dump position the bucket 28 will be so disposed at ground level that the plane through the cutting edge is inclined downwardly and rearwardly relative to the tractor. Excellent spreading of material on the ground may be achieved with the bucket 28 in this position.

Many other advantages are inherent in the described construction of the present invention such as good mechanical advantage in the various lever arms, a relatively high reach of the bucket in dumping, ability to shake sticky materials from the bucket in any dumping operation, and excellent ability to work the cutting edge 52 of the bucket 28 into hard materials.

Having described the invention, what is considered new and desired to be protected by Letters Patent is:

1. In a tractor loader, a boom pivotally mounted at one end thereof on said tractor and extending forwardly thereof, a bucket carrier pivotally connected to the forward end of said boom, means carried at one end on said tractor and connected at the other end to said bucket carrier for pivoting said bucket carrier relative to said boom, a bucket pivotally connected to said carrier, and means pivotally connected between said boom and said bucket for pivoting said bucket relative to said carrier, the pivotal axis of the connection of said last mentioned means to said bucket being positioned to substantially coincide with the pivotal axis of the connection of said bucket carrier to said boom when said bucket is pivotally positioned against said bucket carrier.

2. In a tractor loader, a boom pivotally mounted at one end thereof on said tractor and extending forwardly thereof, a bucket carrier pivotally connected to the forward end of said boom, a hydraulic ram pivotally carried at one end on said tractor and pivotally connected at the other end thereof to said bucket carrier for pivoting said bucket carrier relative to said boom, a bucket pivotally connected to said carrier, and hydraulic ram means pivotally connected between said boom and said bucket for pivoting said bucket relative to said carrier, the pivotal axis of the connection of said hydraulic ram means to said bucket being positioned to substantially coincide with the pivotal axis of the connection of said bucket carrier to said boom when said hydraulic ram means is operated to position said bucket against said bucket carrier.

3. In a tractor loader, a boom pivotally mounted at one end thereof on said tractor and extending forwardly thereof, a bucket carrier pivotally connected to the forward end of said boom, a hydraulic ram pivotally carried at one end thereof on said tractor and pivotally connected at the other end thereof to said bucket carrier for pivoting said bucket carrier relative to said boom, a bucket pivotally connected to said carrier and a hydraulic ram pivotally connected between said boom and said bucket for pivoting said bucket relative to said carrier, said first and second hydraulic rams being formed so that said bucket is in the digging position when said first and second hydraulic rams are completely retracted.

4. In a tractor loader, a boom pivotally mounted at one end thereof on said tractor and extending forwardly thereof, a bucket carrier pivotally connected to the forward end of said boom, a hydraulic ram carried at one end on said tractor for pivotal movement about a transverse axis positioned forwardly and below the pivotal axis of said boom on said tractor and pivotally connected at the other end thereof to said bucket carrier for pivoting said bucket carrier relative to said boom, a bucket pivotally connected to said carrier, and hydraulic ram means pivotally connected between said boom and said bucket for pivoting said bucket relative to said carrier, said bucket being positioned in the digging position when said hydraulic ram and said hydraulic ram means are completely retracted.

5. In a tractor loader as claimed in claim 4, wherein the pivotal axis of said bucket carrier on said boom is disposed substantially above the pivotal axis of said hydraulic ram to said bucket carrier.

6. In a tractor loader, a boom pivotally mounted at one end thereof on said tractor and extending forwardly thereof, a bucket carrier pivotally connected to the forward end of said boom, a hydraulic ram carried at one end on said tractor for pivotal movement about a transverse axis positioned forwardly and below the pivotal axis of said boom on said tractor and pivotally connected at the other end thereof to said bucket carrier for pivoting said bucket carrier relative to said boom, a bucket pivotally connected to said carrier, hydraulic ram means pivotally connected between said boom and said bucket for pivoting said bucket relative to said carrier, said hydraulic ram and said hydraulic ram means being formed and positioned so that said bucket is positioned in the digging position when said hydraulic ram and said hydraulic ram means are completely retracted, the pivotal axis of said bucket carrier on said boom being disposed substantially above the pivotal axis of said hydraulic ram to said bucket carrier when said bucket is in the digging position, and the pivotal axis of said hydraulic ram means to said bucket being positioned to substantially coincide with the pivotal axis of said carrier on said boom when said bucket is pivotally positioned against said carrier.

7. In a tractor loader as claimed in claim 6, wherein the pivotal axis of said bucket to said carrier is positioned below and forwardly of the pivotal axis of said hydraulic ram to said bucket carrier.

8. In a tractor loader, a boom pivotally mounted at one end thereof on said tractor and extending forwardly thereof; a digging bucket having a curved plate forming the rear and bottom walls thereof, a bucket carrier being pivotally connected to said bottom wall forwardly of said rear wall of said bucket, said bucket carrier having a curvature conforming to the curvature of said rear and bottom walls of the bucket, means pivotally connecting the other end of said bucket carrier to the forward end of said boom, means carried at one end on said tractor and being connected at the other end to said bucket carrier intermediate the ends thereof for pivoting said bucket carrier relative to said boom about the pivotal axis of the connection of said bucket carrier to said boom, and means pivotally connected between said boom and said bucket for pivoting said bucket relative to said bucket carrier, the pivotal axis of the connection of said last mentioned means to said bucket being positioned to substantially coincide with the pivotal axis of the connection of said bucket carrier to said boom when said bucket is pivotally positioned against said bucket carrier.

9. In a tractor loader, a boom pivotally mounted at one end thereof on said tractor and extending forwardly thereof, a digging bucket having a curved plate forming the rear and bottom walls thereof, a bucket carrier being pivotally connected to said bottom wall forwardly of the rear wall of said bucket, said bucket carrier having a curvature conforming to the curvature of the rear and bottom walls of said bucket, means pivotally connecting the other end of said bucket carrier to the forward end of said boom, hydraulic ram means pivotally carried at one end on said tractor and being pivotally connected at the other end thereof to said bucket carrier intermediate the ends thereof for pivoting said bucket carrier relative to said boom about the pivotal axis of the connection of said bucket carrier to said boom, and second hydraulic ram means pivotally connected between said boom and said bucket for pivoting said bucket relative to said bucket carrier, the pivotal axis of the connection of said second hydraulic ram means to said bucket being positioned to substantially coincide with the pivotal axis of the connection of said bucket carrier to said boom when said bucket is pivotally positioned against said bucket carrier.

10. In a tractor loader as claimed in claim 9, wherein said first and second hydraulic ram means are formed so that said bucket is in the digging position when said first and second hydraulic ram means are completely retracted.

11. In a tractor loader as claimed in claim 10, wherein said bucket carrier is formed so that when said bucket is in the digging position, the axis of the pivotal connection of said first hydraulic ram means to said bucket carrier is positioned substantially below the axis of the pivotal connection of said bucket carrier to said boom.

12. In a tractor loader, a boom pivotally mounted at one end thereof on said tractor and extending forwardly thereof, hydraulic ram means pivotally connected between said tractor and said boom intermediate the ends thereof for pivoting said boom relative to said tractor, a bucket carrier pivotally connected to the forward end of said boom, a hydraulic ram pivotally carried at one end on said tractor and pivotally connected at the other end thereof to said bucket carrier for pivoting said bucket carrier relative to said boom, a bucket pivotally connected to said carrier, a second hydraulic ram pivotally carried at one end thereof on said boom intermediate the ends thereof, a lever pivotally carried at one end thereof on said boom intermediate the ends thereof forwardly of the pivotal connection of said second hydraulic ram to said boom, means pivotally connecting the other end of said second hydraulic ram to said lever intermediate the ends thereof, a link pivotally connected to the other end of said lever, the other end of said link pivotally connected to said bucket whereby said bucket is pivoted relative to said carrier when said second hydraulic ram is extended and retracted, the pivotal axis of the connection of said link to said bucket being positioned to substantially coincide with the pivotal axis of the connection of said bucket carrier to said boom when said second hydraulic ram is completely retracted to position said bucket against said bucket carrier.

13. In a tractor loader as claimed in claim 12, wherein said bucket is positioned in a substantially horizontal digging position at ground level when said hydraulic ram means and said first and second hydraulic rams are completely retracted.

References Cited in the file of this patent

UNITED STATES PATENTS

| | | |
|---|---|---|
| 2,768,759 | Holopainen | Oct. 30, 1956 |
| 2,799,410 | Carlson | July 16, 1957 |
| 2,835,397 | Wagner | May 20, 1958 |